(12) United States Patent
Jung et al.

(10) Patent No.: US 9,191,054 B2
(45) Date of Patent: Nov. 17, 2015

(54) MOBILE COMMUNICATION TERMINAL DEVICE EQUIPPED WITH REPLACEABLE COMMUNICATION MODULE AND BACK COVER THEREOF

(71) Applicant: Electronics and Telecommunications Research Institute, Daejeon (KR)

(72) Inventors: Woo-Sug Jung, Daejeon (KR); Jong-Dae Park, Daejeon (KR); Soon-Seok Lee, Daejeon (KR); Dae-Sik Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 204 days.

(21) Appl. No.: 14/014,290

(22) Filed: Aug. 29, 2013

(65) Prior Publication Data
US 2014/0094219 A1    Apr. 3, 2014

(30) Foreign Application Priority Data
Sep. 28, 2012    (KR) .................... 10-2012-0109397

(51) Int. Cl.
*H04B 1/40* (2015.01)
*H04B 1/3827* (2015.01)
*H04B 1/3877* (2015.01)

(52) U.S. Cl.
CPC ............ *H04B 1/3833* (2013.01); *H04B 1/3877* (2013.01)

(58) Field of Classification Search
CPC ............................ H04B 1/3833; H04B 1/3877

USPC ............. 455/552.1, 553.1, 550.1, 127.2, 136, 455/138
See application file for complete search history.

(56) References Cited

U.S. PATENT DOCUMENTS

| | | | |
|---|---|---|---|
| 7,612,725 B2 | 11/2009 | Hill et al. | |
| 7,843,396 B2 | 11/2010 | Hill et al. | |
| 7,924,231 B2 | 4/2011 | Hill et al. | |
| 8,169,374 B2 | 5/2012 | Hill et al. | |
| 2005/0128936 A1* | 6/2005 | Shao | 370/208 |
| 2007/0019577 A1 | 1/2007 | Jang | |
| 2008/0258985 A1 | 10/2008 | Ryou et al. | |
| 2010/0022215 A1* | 1/2010 | Ganger et al. | 455/339 |
| 2011/0150066 A1* | 6/2011 | Fujimoto | 375/224 |
| 2012/0046002 A1 | 2/2012 | Hill et al. | |

FOREIGN PATENT DOCUMENTS

| | | |
|---|---|---|
| KR | 10-2006-0029034 A | 4/2006 |
| KR | 10-2006-0038791 A | 5/2006 |
| KR | 10-2006-0042058 A | 5/2006 |
| KR | 10-2006-0104186 A | 10/2006 |

(Continued)

*Primary Examiner* — John J Lee

(57) ABSTRACT

A mobile communication terminal device equipped with a replaceable communication module and a back cover thereof are provided. The mobile communication terminal device includes: a host processor configured to control and operate the mobile communication terminal device; a baseband processing unit configured to process a mobile communication protocol; and a radio frequency (RF) signal processing unit configured to wirelessly communicate with a mobile communication network, wherein the host processor, the baseband processing unit and the RF signal processing unit are further configured to be implemented as modules that are attachable to or detachable from a printed circuit board (PCB) of the mobile communication terminal device.

7 Claims, 4 Drawing Sheets

(56) References Cited

FOREIGN PATENT DOCUMENTS

| | | |
|---|---|---|
| KR | 10-2007-0012592 A | 1/2007 |
| KR | 10-2007-0069547 A | 7/2007 |
| KR | 10-2007-0109025 A | 11/2007 |
| KR | 10-2009-0002516 A | 1/2009 |
| KR | 10-2009-0020835 A | 2/2009 |
| KR | 10-2009-0066175 A | 6/2009 |
| KR | 10-2009-0085198 A | 8/2009 |
| KR | 10-2009-0132336 A | 12/2009 |
| KR | 10-2010-0018380 A | 2/2010 |
| KR | 10-2010-0136196 A | 12/2010 |
| KR | 10-2011-0099792 A | 9/2011 |
| KR | 10-2011-0126235 A | 11/2011 |
| WO | WO 2009/005271 A2 | 1/2009 |

\* cited by examiner

MOBILE COMMUNICATION TERMINAL DEVICE EQUIPPED WITH REPLACEABLE COMMUNICATION MODULE AND BACK COVER THEREOF

CROSS-REFERENCE TO RELATED APPLICATION(S)

This application claims priority from Korean Patent Application No. 10-2012-0109397, filed on Sep. 28, 2012, in the Korean Intellectual Property Office, the entire disclosure of which is incorporated herein by reference for all purposes.

BACKGROUND

1. Field

The following description relates to a mobile communication terminal device, and more particularly, to a mobile communication terminal device equipped with a replaceable communication module and a back cover thereof.

2. Description of the Related Art

In accordance with various user demands and changes in communication methods (such as the transition from 2G to 3G and 4G) and the environment of communication, mobile communication terminals have evolved to be equipped with multimedia functions such as voice and video call functions, a video player function, etc., and to be able to perform a variety of other functions based on applications. The frequency of the replacement of mobile communication devices has considerably decreased, partly due to developments in mobile communication technology and an increasing demand for larger bandwidths.

In the related art, a variety of functions of a mobile communication terminal device are all embedded into a single physical printed circuit board (PCB). However, some of the functions may even be unnecessary to a user, and this type of method generally increases the manufacturing cost of the mobile communication terminal device. In addition, since the frequency of the replacement of mobile communication devices has generally shortened, the user may have to pay a high price not only for the purchase but also for the maintenance and replacement of the mobile communication terminal device. Moreover, in a case in which several radio frequency (RF) interfaces are embedded into a single physical space, the RF interfaces are likely to interfere with each other, thereby making it unstable to transmit and receive RF signals.

SUMMARY

The following description relates to considerably reducing the purchase and maintenance costs of a mobile communication terminal device and providing a wireless environment that can better suit a user's demand by separating the functions of the mobile communication terminal device into functional modules so that the user can reconfigure the mobile communication terminal device into a desired shape in accordance with a change in the environment of the use of the mobile communication terminal device.

In one general aspect, a mobile communication terminal device includes: a host processor configured to control and operate the mobile communication terminal device; a baseband processing unit configured to process a mobile communication protocol; and a radio frequency (RF) signal processing unit configured to wirelessly communicate with a mobile communication network, wherein the host processor, the baseband processing unit and the RF signal processing unit are further configured to be implemented as modules that are attachable to or detachable from a printed circuit board (PCB) of the mobile communication terminal device.

The baseband processing unit and the RF signal processing unit may be further configured to be embedded in a back cover of the mobile communication terminal device.

The mobile communication terminal device may also include a gain increase antenna unit configured to increase the gain of an antenna, wherein the gain increase antenna unit is embedded in the back cover.

A main body and a back cover of the mobile communication terminal device may each include a module insertion hole by which each module embedded in the main body or the back cover is easily replaceable.

In another general aspect, a back cover of a mobile communication terminal device, includes: an RF signal processing unit configured to wirelessly communicate with a mobile communication network; and a gain increase antenna unit configured to increase the gain of an antenna.

The back cover may also include a baseband processing unit configured to process a mobile communication protocol.

The RF signal processing unit and the gain increase antenna unit may be further comprised to be implemented as replaceable modules, and the back cover may include a module insertion hole by which each module embedded in the back cover is easily replaceable.

Other features and aspects may be apparent from the following detailed description, the drawings, and the claims.

Figure 1:
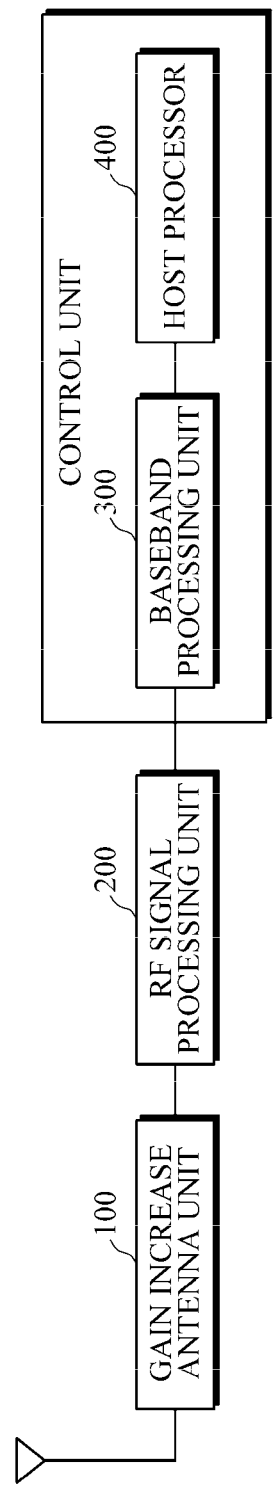
FIG. 1 is a block diagram illustrating an example of a mobile communication terminal device.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

FIG. 1 is a block diagram illustrating an example of a mobile communication terminal device. Referring to FIG. 1, the mobile communication terminal device includes a radio frequency (RF) signal processing unit 200, a baseband processing unit 300 and a host processor 400. The RF signal processing unit 200, the baseband processing unit 300 and the host processor 400 may be implemented as modules that are attachable to or detachable from a printed circuit board (PCB) of the mobile communication terminal device and are thus easily replaceable.

The RF signal processing unit 200 processes RF signals for wireless communications with a mobile communication network. The baseband processing unit 300 processes mobile communication protocols. The host processor 400 controls and operates the mobile communication terminal device.

The mobile communication terminal device may also include a gain increase antenna unit 100 which increases the gain of an antenna.

In an example, the baseband processing unit 300 and the host processor 400 may be implemented as separate modules. In another example, the baseband processing unit 300 and the host processor 400 may be incorporated into a single module, e.g., a control unit.

Figure 2:
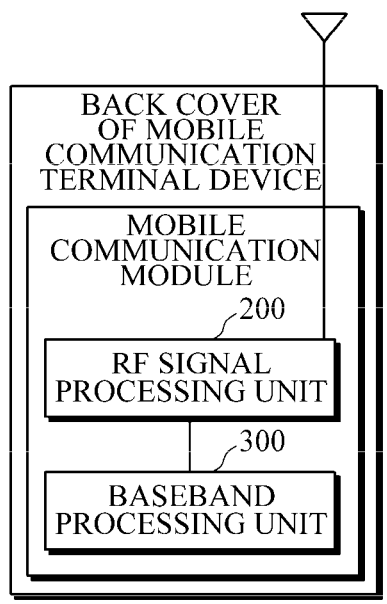
FIG. 2 is a block diagram illustrating an example of a back cover of another mobile communication terminal device.

FIG. 2 is a block diagram illustrating an example of a back cover of a mobile communication terminal device. In the example illustrated in FIG. 2, the mobile communication terminal device includes a main body and a back cover. For convenience, an illustration and description of the main body will be omitted.

Referring to FIG. 2, an RF signal processing unit 200 and a baseband processing unit 300 are embedded in the back cover. In an example, the RF signal processing unit 200 and the baseband processing unit 300 may be implemented as separate modules. In another example, the RF signal processing unit 200 and the baseband processing unit 300 may be incorporated into a single mobile communication module (200, 300).

In an example, a gain increase antenna unit (not illustrated) may also be embedded in the back cover. In this example, the gain increase antenna unit may be incorporated into the mobile communication module (200, 300).

The mobile communication module (200, 300) may be configured to be attachable to or detachable from the back cover or to be fixed onto the back cover. The mobile communication terminal device may be transformed into a mobile communication terminal device desired by a user simply by replacing the mobile communication module (200, 300) or the entire back cover depending on whether the mobile communication module (200, 300) is detachably coupled to or fixed onto the back cover.

Figure 3:
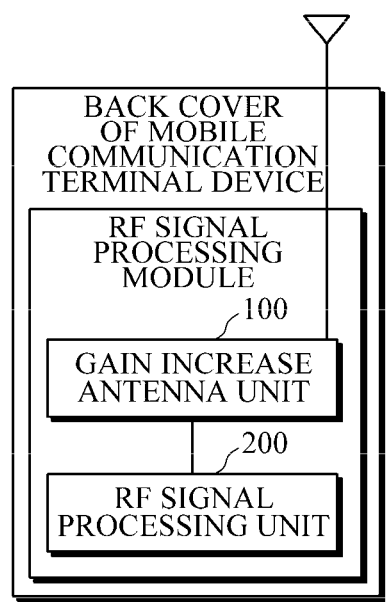
FIG. 3 is a block diagram illustrating an example of a back cover of another mobile communication terminal device.

FIG. 3 is a block diagram illustrating another example of a back cover of a mobile communication terminal device. In the example illustrated in FIG. 3, the mobile communication terminal device includes a main body and a back cover. For convenience, an illustration and description of the main body will be omitted.

Referring to FIG. 3, a gain increase antenna unit 100 and an RF signal processing unit 200 are embedded in the back cover. In an example, the gain increase antenna unit 100 and the RF signal processing unit 200 may be implemented as separate modules. In another example, the gain increase antenna unit 100 and the RF signal processing unit 200 may be incorporated into a single RF signal processing module (100, 200).

The RF signal processing module (100, 200) may be configured to be attachable to or detachable from the back cover or to be fixed onto the back cover. The mobile communication terminal device may be transformed into a mobile communication terminal device desired by a user simply by replacing the RF signal processing module (100, 200) or the entire back cover depending on whether the RF signal processing module (100, 200) is detachably coupled to or fixed onto the back cover.

Figure 4:
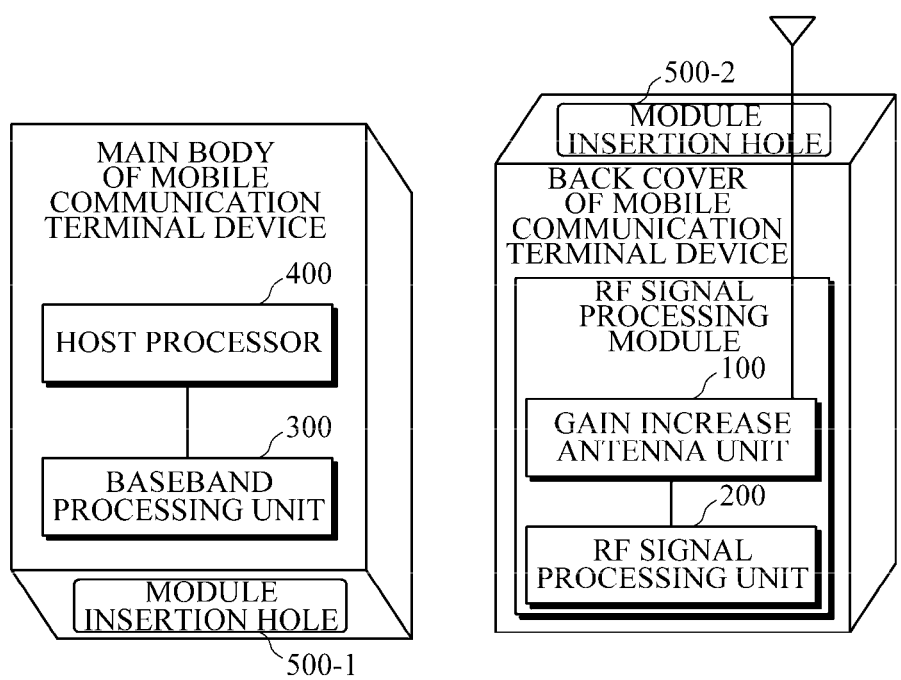
FIG. 4 is a diagram illustrating an example of how to configure a mobile communication terminal device by means of the back cover illustrated in FIG. 3.

FIG. 4 is a diagram illustrating an example of the configuring of a mobile communication terminal device by means of a back cover. In the example illustrated in FIG. 4, the mobile communication terminal device includes a main body and a back cover.

The main body includes a host processor 400 and a baseband processing unit 300. The back cover includes an RF signal processing module (100, 200). In an example, the host processor 400 and the baseband processing unit 300 may be implemented as separate modules. In another example, the host processor 400 and the baseband processing unit 300 may be incorporated into a single hardware module.

The main body may also include a module insertion hole 500-1 by which the baseband processing unit 300 and the host processor 400 can be easily replaced, and the back cover may also include a module insertion hole 500-2 by which the RF signal processing module (100, 200) can be easily replaced.

As described above, since a mobile communication terminal device is modularlized into a number of functional modules that can be easily replaced individually, it is possible to reconfigure the mobile communication terminal device into a desired mobile communication terminal device in accordance with a mobile communication method used and a change in the environment of use of the mobile communication terminal device. In addition, since the main body of the mobile communication terminal device and an RF signal processing function are separated, it is possible to address the problem of limited physical space. Moreover, since a gain increase antenna unit is added to the mobile communication terminal device, it is possible to stably provide a quality of mobile communication service to the user.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile communication terminal device, comprising:
    a host processor configured to control and operate the mobile communication terminal device;
    a baseband processing unit configured to process a mobile communication protocol; and
    a radio frequency (RF) signal processing unit configured to wirelessly communicate with a mobile communication network,
    wherein the host processor, the baseband processing unit and the RF signal processing unit are implemented as modules that are attachable to or detachable from a printed circuit board (PCB) of the mobile communication terminal device.

2. The mobile communication terminal device of claim 1, wherein the baseband processing unit and the RF signal processing unit are further configured to be embedded in a back cover of the mobile communication terminal device.

3. The mobile communication terminal device of claim 2, further comprising:
    a gain increase antenna unit configured to increase a gain of an antenna,
    wherein the gain increase antenna unit is embedded in the back cover.

4. The mobile communication terminal device of claim 1, further comprising:
    a gain increase antenna unit configured to increase a gain of an antenna, wherein the RF signal processing unit and the gain increase antenna unit are embedded in a back cover of the mobile communication terminal device.

5. The mobile communication terminal device of claim 1, wherein a main body and a back cover of the mobile communication terminal device each comprise a module insertion hole by which each module embedded in the main body or the back cover is easily replaceable.

6. A back cover of a mobile communication terminal device, comprising:
- a radio frequency (RF) signal processing unit configured to wirelessly communicate with a mobile communication network; and
- a gain increase antenna unit configured to increase a gain of an antenna,
- wherein the RF signal processing unit and the gain increase antenna unit are implemented as replaceable modules and the back cover further comprises a module insertion hole by which each module embedded in the back cover is easily replaceable.

7. The back cover of claim 6, further comprising:
a baseband processing unit configured to process a mobile communication protocol.

* * * * *